(12) United States Patent
Dang et al.

(10) Patent No.: US 11,341,156 B2
(45) Date of Patent: May 24, 2022

(54) DATA SEGMENTATION AND VISUALIZATION

(71) Applicants: Microsoft Technology Licensing, LLC, Redmond, WA (US); Yingnong Dang, Beijing (CN); Rui Ding, Beijing (CN); Haoyu Jiang, Beijing (CN); Fei Liu, Beijing (CN); Dongmei Zhang, Beijing (CN)

(72) Inventors: Yingnong Dang, Beijing (CN); Rui Ding, Beijing (CN); Haoyu Jiang, Beijing (CN); Fei Liu, Beijing (CN); Dongmei Zhang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1926 days.

(21) Appl. No.: 14/898,067

(22) PCT Filed: Jun. 13, 2013

(86) PCT No.: PCT/CN2013/077167
§ 371 (c)(1),
(2) Date: Dec. 11, 2015

(87) PCT Pub. No.: WO2014/198038
PCT Pub. Date: Dec. 18, 2014

(65) Prior Publication Data
US 2016/0117373 A1    Apr. 28, 2016

(51) Int. Cl.
*G06F 16/26* (2019.01)
*G06F 16/27* (2019.01)
*G06F 16/28* (2019.01)

(52) U.S. Cl.
CPC .............. *G06F 16/26* (2019.01); *G06F 16/27* (2019.01); *G06F 16/287* (2019.01)

(58) Field of Classification Search
CPC ......... G06F 17/30572; G06F 17/30575; G06F 17/30601; G06F 16/26; G06F 16/287;
(Continued)

(56) References Cited

U.S. PATENT DOCUMENTS 5,199,543 A * 4/1993 Kamagami .............. G07D 7/12
                                                  194/207
6,004,276 A * 12/1999 Wright ................. G06F 19/322
                                                  128/923
(Continued)

FOREIGN PATENT DOCUMENTS

CN         101821777         9/2010

OTHER PUBLICATIONS

Bertini, et al., "Surveying the Complementary Role of Automatic Data Analysis and Visualization in Knowledge Discovery", In Proceedings of the ACM SIGKDD Workshop on Visual Analytics and Knowledge Discovery: Integrating Automated Analysis with Interactive Exploration, Jun. 28, 2009, pp. 12-20.
(Continued)

*Primary Examiner* — Pierre M Vital
*Assistant Examiner* — Andalib F Lodhi
(74) *Attorney, Agent, or Firm* — Jacob P. Rohwer; Newport IP, LLC

(57) ABSTRACT

The techniques described herein provide tools that summarize a dataset by creating a final set of segments that, when visually presented via a histogram or other data presentation tool, show the distribution of at least a portion of the data. To create the final set of segments, the techniques described herein may collect or receive a dataset with distinct values, and divide the dataset into a number of segments that is less than or equal to a segment presentation threshold (e.g., ten segments). After creating the final set of segments, the techniques may configure and/or present data visualizations,
(Continued)

such as histograms, for the created segments so that an observer is provided with a good viewing experience.

14 Claims, 8 Drawing Sheets

(58) Field of Classification Search
CPC .... G06F 16/27; G06F 16/182; G06F 16/2465; G06F 16/278; G06F 16/285; G06F 16/84; G06F 16/13; G06F 16/1744; G06F 16/24568; G06F 16/25; G06F 16/2471; G06F 16/24545; G06F 16/2455; G06F 16/2425; G06F 16/24535; G06F 16/24539; G06F 16/24554; G06F 16/283; G06F 16/148; G06F 16/244; G06F 16/24526; G06F 16/248; G06F 16/35; G06F 16/56; G06F 16/9017
See application file for complete search history.

(56) References Cited

U.S. PATENT DOCUMENTS

| | | | | |
|---|---|---|---|---|
| 7,246,369 | B1* | 7/2007 | Duan | H04N 7/17318 348/E7.071 |
| 7,742,639 | B2 | 6/2010 | Eck et al. | |
| 8,255,388 | B1* | 8/2012 | Luo | G06F 16/217 707/719 |
| 8,285,752 | B1 | 10/2012 | Golan et al. | |
| 8,286,100 | B2 | 10/2012 | Helfman et al. | |
| 9,063,659 | B2* | 6/2015 | Kim | G06F 3/0611 |
| 2003/0018601 | A1* | 1/2003 | Lee | G06F 16/2465 706/45 |
| 2003/0048204 | A1* | 3/2003 | Qureshi | G01C 23/005 340/971 |
| 2003/0176931 | A1* | 9/2003 | Pednault | G06K 9/6282 700/31 |
| 2009/0099904 | A1* | 4/2009 | Affeld | G06Q 30/0244 705/14.43 |
| 2009/0287814 | A1* | 11/2009 | Robertson | G06Q 10/10 709/224 |
| 2010/0231595 | A1 | 9/2010 | Dang et al. | |
| 2011/0137907 | A1 | 6/2011 | Ikenoue | |
| 2011/0154015 | A1* | 6/2011 | Rahman | G06F 21/6209 713/150 |
| 2011/0222787 | A1* | 9/2011 | Thiemert | G06F 17/30802 382/225 |
| 2011/0225287 | A1* | 9/2011 | Dalal | G06F 16/958 709/224 |
| 2012/0313949 | A1* | 12/2012 | Rope | G06F 16/9038 345/440 |
| 2014/0136089 | A1* | 5/2014 | Hranac | G08G 1/096775 701/118 |
| 2014/0289371 | A1* | 9/2014 | Moore | H04L 65/607 709/219 |

OTHER PUBLICATIONS

Glebanon, "Graphing One Dimensional Numeric Data with R", Retrieved at http://smlv.cc.gatech.edu/2010/04/04/graphing-one-dimensional-numeric-data-with-r/ on Mar. 4, 2013, Apr. 4, 2010, 10 pages.

Kandel, et al., "Profiler: Integrated Statistical Analysis and Visualization for Data Quality Assessment", In Proceedings of International Working Conference on Advanced Visual Interfaces, May 21, 2012, 8 pages.

Kriegel, et al., "LoOP: Local Outlier Probabilities", In Proceedings of the 18th ACM Conference on Information and Knowledge Management, Nov. 2, 2009, pp. 1649-1652.

PCT search report and written report dated Mar. 13, 2014 for PCT Application No. PCT/CN2013/077167, 11 pages.

Theus, Martin, "Mondrian", Oct. 23, 2012, 32 pages.

Williams, Graham J., "Rattle: A Data Mining GUI for R", The R Journal, vol. 1/2, Dec. 2009, pp. 45-55.

* cited by examiner

DATA SEGMENTATION AND VISUALIZATION

This Application is a 35 U.S.C. 371 National Stage Entry of and claims priority from PCT Application Serial No. PCT/CN2013/077167, titled "Data Segmentation and Visualization", filed on Jun. 13, 2013, the entire contents of which are incorporated herein by reference.

BACKGROUND

Today, systems can efficiently collect and/or access large amounts of data for analysis. For example, a weather system may be configured to collect global climate data from all over the world. A government, a non-profit organization, or a corporate entity may collect demographic information for a particular region (e.g., zip code, city, state, country, etc.). Once collected, the systems may organize and present the data to data analysts or any other person who wants to understand the data and who may seek to draw a conclusion based on visual patterns revealed by the data.

Accordingly, conventional systems may configure and visually present the data using graphs and charts, such as histograms and scatter-plots, to help the data analysts better understand the data. However, the visual presentations are often unable to provide a good understanding of noisy or skewed data. For instance, a dataset may cover a wide range of values, which may result from extreme outlying values that do not occur frequently in the dataset. In this scenario, the data distributed across the wide range of values may not provide a good visual effect when presented via a histogram, for example. Another example that may not result in a good visual presentation is a dataset that contains a small number of values that occur frequently or a small range of values that contain a large percentage of the overall dataset (e.g., high hitting values or a high hitting range of values). These extreme outliers and high hitters may be relevant to a data analyst attempting to obtain an understanding of the dataset when viewing a histogram. Consequently, a data analyst or other observer of the histogram may have a difficult time trying to understand data that is noisy or highly skewed.

SUMMARY

The techniques described herein provide tools that summarize a dataset by creating a final set of segments that, when visually presented via a histogram or other data presentation tool, show the distribution of at least a portion of the data. To create the final set of segments, the techniques described herein may separate a dataset with distinct values into a number of segments that is less than or equal to a segment presentation threshold (e.g., ten segments). After creating the final set of segments, the techniques may configure and/or present histograms for the created segments so that an observer is provided with a more useful viewing experience.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
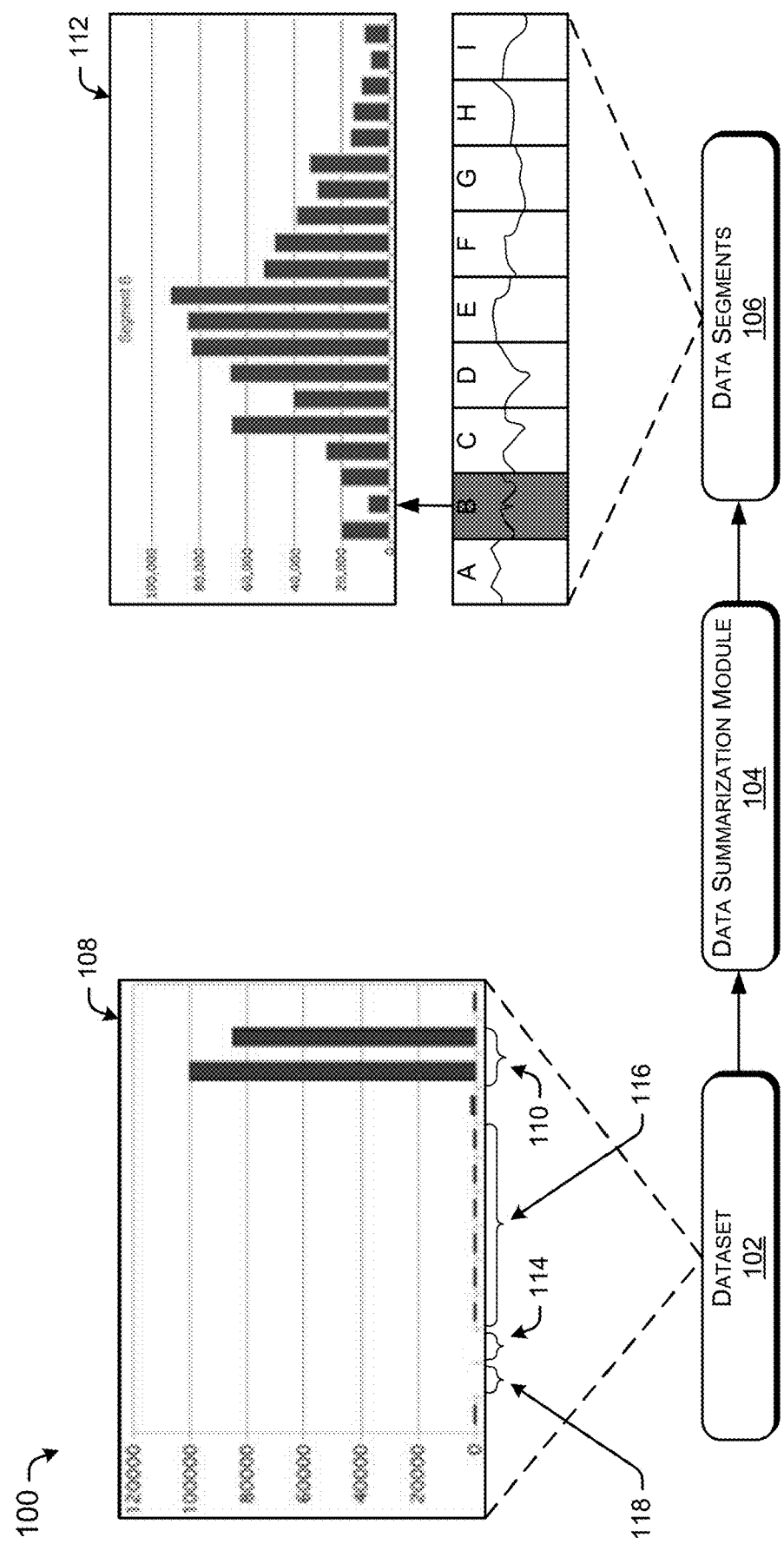
FIG. 1 illustrates an example overview for creating segments that summarize a dataset, in accordance with various embodiments.

The techniques described herein provide tools that summarize a dataset by creating a final set of segments that, when visually presented via a histogram or other data presentation tool, show the distribution of at least a portion of the data. That is, each final segment covers a range of values in the dataset, and the distribution across the range of values for each segment provides an observer with a good visual effect. The techniques described herein use characteristics of the dataset to merge values so that an observer can achieve a better understanding of the data. In various embodiments, after creating the final set of segments, the techniques may configure and/or present histograms for the created segments so that an observer can view useful information that characterizes the dataset. Moreover, the techniques may initially configure and/or present additional summary information of the data set by using data charts, tables and/or statistics based on the dataset and the created segments. The techniques may also adjust the presentation of information based on input provided by the observer.

To create the final set of segments, the techniques described herein may collect or receive a dataset with distinct values and merge the distinct values that are close to each other into a set of first merge segments with the number of first merge segments being less than or equal to a first segment threshold (e.g., less than or equal to fifty thousand or one hundred thousand segments). Then, the techniques may merge the set of first merge segments, based on a visual quality, into a set of second merge segments with the number of second merge segments being less than or equal to a second segment threshold (e.g., less than or equal to one hundred and fifty segments or other threshold number between fifty and three hundred). A greedy approach may be used in the second phase to merge two neighboring first merge segments with a highest gain directed to increasing the visual quality after merging. Finally, the techniques may implement a final, or third, merge to arrive at a final set of segments with the number of final segments being less than or equal to a segment presentation threshold (e.g., ten segments or other threshold number between five and fifty). The third merge phase may implement a dynamic programming approach for efficient merging. While three segment merges are described herein, it is understood in the context of this document that the techniques may perform more or less than three merge phases to arrive at the final set of segments.

The final set of segments includes a number of segments that an observer (e.g., data analyst) of the dataset can select and/or navigate while seeking to achieve a good understanding of the dataset. The range of values covered by individual segments in the final set may vary based on the visual effect provided. For example, a first segment may cover a range of values from zero to twenty, while a second segment may cover a range of values from twenty to one hundred.

Thus, the techniques described herein are directed to identifying and/or creating segments in the dataset that are capable of visually revealing interesting patterns. In various embodiments, the dataset is one dimensional data that covers a range of values. Thus, each of the values in the dataset may include an integer, a decimal, a float, a double, or a combination thereof. In some embodiments, the values in the dataset may be associated with other data representations such as a range of time (e.g., day, month, year, etc.).

In particular, the techniques discussed herein are effective in summarizing and visualizing a dataset that is highly skewed (e.g., contains extreme outliers and/or high hitting values or high hitting ranges of values). FIG. 1 illustrates an example overview 100 of a technique that creates a final set of segments for a dataset 102. The dataset 102 is provided to a data summarization module 104, which then implements various merge phases to create the final set of segments 106 (e.g., segments A through I). The data shown by the histogram 108 in FIG. 1 is an example of noisy or skewed data that, when presented, does not provide a clear understanding or good visual effect to an observer. For instance, the histogram 108 is highly skewed because of the distribution of data. That is, the histogram includes two values or value ranges 110 that contain most of the data occurrences or data counts in the dataset (e.g., high hitters), while the other values or value ranges appear barely visible or non-existent. Thus, due to the skewed distribution of data occurrences across the range of values in the dataset, an observer most likely will have a difficult time understanding the histogram 108 based on a scale (e.g., y-axis) configured to include the high hitters (e.g., values or value ranges 110). As a result, the histogram 108, when visually presented, may mask or hide a lot of useful information about the dataset 102.

As used herein, a "histogram" partitions the values in the dataset 102 into various buckets, and maintains summary information about each bucket to approximate the dataset. Each bucket may represent a unique value in the dataset or a range of values in the dataset. As an example, histogram 108 in FIG. 1 shows thirteen buckets (e.g., thirteen values or thirteen ranges of values) on an x-axis, and the eleventh and twelfth buckets (e.g., values or value ranges 110) contain most of the data occurrences in the dataset 102 (e.g., the high hitter buckets). The frequency or number of occurrences of a value are illustrated or scaled by the y-axis.

To provide a more useful data visualization, the data summarization module 104 receives the dataset 102 and analyzes the dataset 102 to create a final set of segments 106 that individually provide a good visual representation of the data contained therein. Thus, each segment in the final set covers a range of values in the dataset, that when displayed via a set of buckets, provides a visually effective representation of the data contained therein. Consequently, individual segments in the final set of segments may cover different value ranges and the buckets within each segment may also be associated with different value ranges so that a good visual representation can be achieved. That is, each of segments A-I in FIG. 1 may result in a different x-axis range and scale and/or y-axis range and scale for displaying the data.

As seen in FIG. 1, in contrast to the skewed distribution of the dataset 102 presented in the histogram 108, the histogram 112 is a histogram that visually reveals patterns of a portion of the dataset 102. The histogram 112 allows an observer to gain a better understanding of the data distributed across a range of values for a segment. That is, the histogram 112 represents data associated with "Segment B", and an observer may navigate or select another segment (e.g., Segment A, Segment C, etc.) to see other data from the dataset 102. In this example scenario, the histogram of Segment A may be associated with the range of values represented by the first ten buckets in the histogram 108, before the high hitting buckets 110. The histogram of Segment A may provide a much improved visual effect compared to histogram 108 because the y-axis no longer has to account for the number of data occurrences for the high hitting buckets 110. Moreover, Segment B may be associated with a much small range of values compared to Segment A. For example, the data presented in the histogram 112 of Segment B may comprise a portion of the data represented by a single high hitter bucket (e.g., the left bucket from the high hitter buckets 110). Other segments (e.g., C, D, E and so forth) may be associated with other portions of data represented by the left most high hitter bucket, for example.

Accordingly, the techniques discussed herein receive a dataset, or collect data for a dataset, and automatically segment the dataset, without user interaction. That is, the segments are "smartly" created to individually provide a good visual effect that reveals patterns. The techniques may then visually generate or build a histogram for each segment in a final set of segments and present the final set of segments to an observer for visual consumption. Thus, the techniques provide a data analyst or other person attempting to visually understand the dataset with a satisfying visual presentation of the data.

Figure 2:
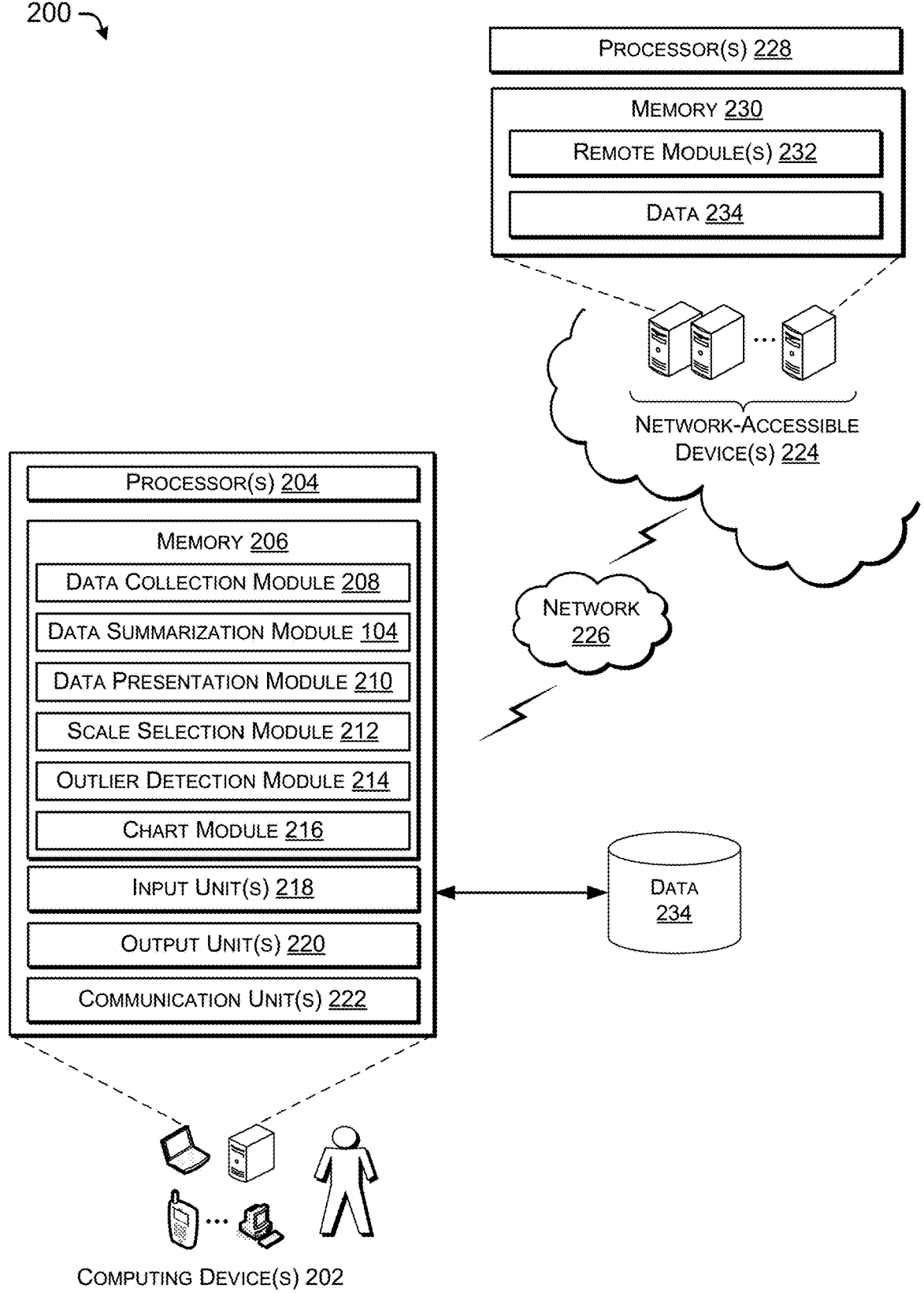
FIG. 2 illustrates an example environment and components for creating segments that summarize a dataset, in accordance with various embodiments.

FIG. 2 illustrates an example environment 200 that implements the techniques described herein. The environment 200 may include one or more computing device(s) 202 where a user or observer is analyzing the data or viewing the data to obtain an understanding. Computing device(s) 202 may include, but are not limited to, smartphones, mobile phones, cell phones, tablet computers, desktop computers, portable computers, laptop computers, personal digital assistants (PDAs), electronic book devices, gaming consoles, personal media player devices, server computers or any other electronic devices that may collect, receive, process and/or present data for visual consumption by an observer (e.g., viewing, analysis, and so forth).

In various embodiments, the computing device 202 may include one or more processors 204 and memory 206. The processor(s) 204 may be a single processing unit or a number of units, each of which could include multiple computing units. The processor(s) 204 may be implemented as one or more microprocessors, microcomputers, microcontrollers, digital signal processors, central processing units, state machines, logic circuitries, system on chip (SoC), and/or any other devices that manipulate signals based on operational instructions. Among other capabilities, the processors 204 may be configured to fetch and execute computer-readable instructions stored in the memory 206.

The memory 206 may include computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The memory 206 may further include a data collection module 208, the data summarization module 104, a data presentation module 210, a scale selection module 212, an outlier detection module 214, a chart module 216, or a combination thereof, each of which is further discussed herein.

In various embodiments, the computing device 202 may also include input unit(s) 218 to receive input from the user (e.g., touch input, buttons, keys, mouse, microphones, sensors, etc.), output unit(s) 220 to convey and/or visually presents the data to the user (e.g., display screens, monitors, speakers, etc.), and communication unit(s) 222 configured to communicate (e.g., receive and/or transmit data) with network-accessible devices 224 via network 226.

In various embodiments, the communication unit(s) 222 are configured to facilitate a wired and/or wireless connection to network 226, content providers, service providers and/or other devices. Therefore, the communication unit(s) 222 and/or network 226 may implement one or more of various wired and/or wireless technologies, such as Internet communications, satellite communications, Wi-Fi communications, mobile telephone network (MTN) communications, or any other acceptable communications or connections protocol.

FIG. 2 also illustrates an implementation where at least some of the functionality implemented by the components of the computing device 202 described above may be performed remotely, or via a network 226, at the network-accessible devices 224. For example, the network-accessible devices 224 may provide cloud services. The network-accessible devices 224 may be servers, and therefore, may also include one or more processors 228 and memory 230. The processor(s) 228 and the memory 230 of the network-accessible devices 224 are physically separate from the processor(s) 204 and memory 206 of the computing device(s) 202, but may function jointly as part of a system that provides processing and memory in part on the computing device(s) 202 and in part on the network-accessible devices 224, for example. These network-accessible devices 224 may be arranged in any number of ways, such as server farms, stacks, and the like that are commonly used in data centers.

The modules and other components illustrated on the computing device 202 are collectively referred to as remote module(s) 232 on the network-accessible devices 224. Thus, the techniques described herein provide an implementation where some of the functionality may optionally be provided at the computing device 202 and at the network-accessible devices 224. For example, in one embodiment, the computing device 202 may display data based on segments created at network-accessible devices 224. Thus, the specific location of the respective modules used to implement the data summarization and visualization techniques discussed herein is not limiting and the description below is equally applicable to any implementation that includes local device(s), a cloud-based service, or combinations thereof.

Example operations are described herein with reference to FIGS. 3-7. The processes are illustrated as logical flow graphs, which represent a sequence of operations that can be implemented in hardware, software, firmware, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Moreover, the example operations in FIGS. 3-7 may be described with reference to the components and/or elements illustrated in FIGS. 1 and 2.

Figure 3:
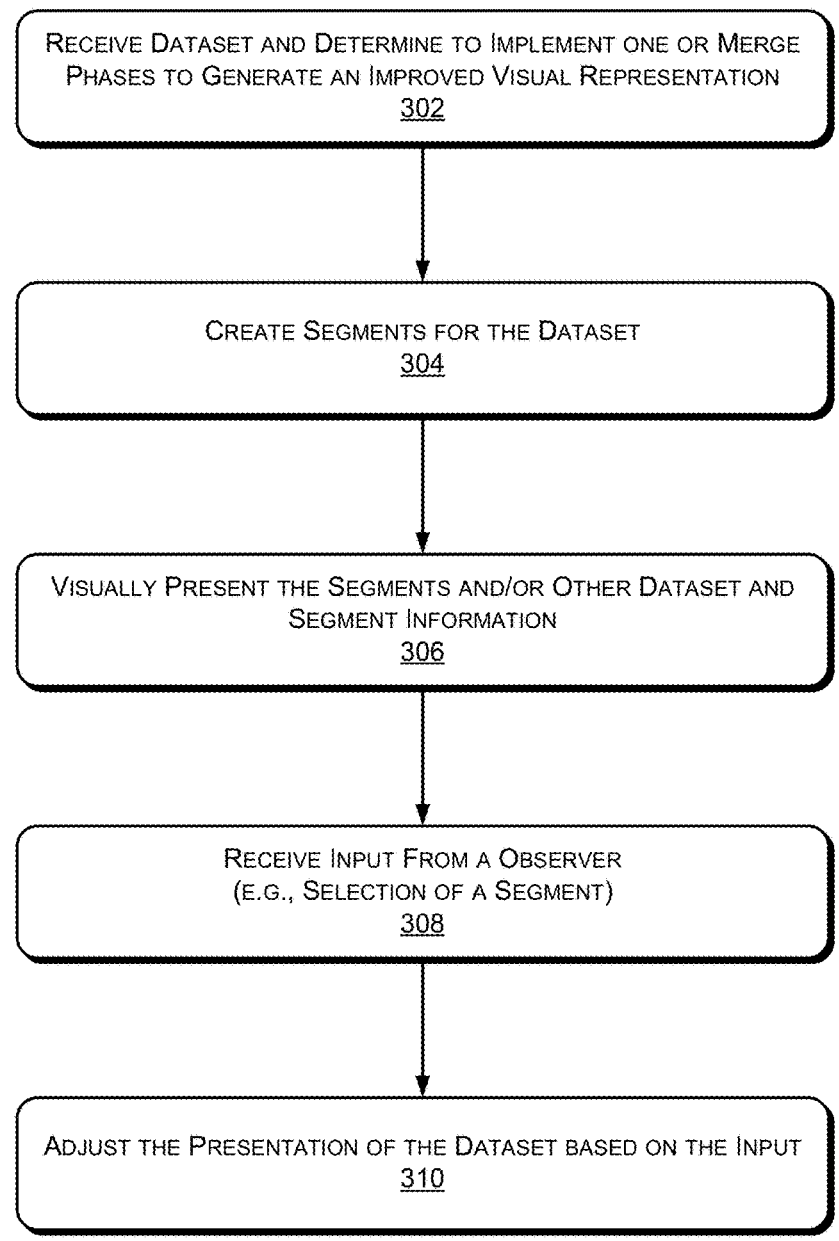
FIG. 3 illustrates an example process for creating segments that summarize a dataset and presenting the segments to an observer, in accordance with various embodiments.

FIG. 3 illustrates an example process 300 that receives a dataset and smartly summarizes the dataset to be visually presented to an observer.

At block 302, the data summarization module 104 receives a dataset and determines to implement one or more merge phases to generate an improved visual representation of the dataset. In various embodiments, the data summarization module 104 receives the dataset based on data 234 collected by the data collection module 208. That is, the data collection module 208 may collect and access data 234 from one or more local and/or remote sources (e.g., database, sensor, etc.). In some instances, the data summarization module 104 may receive a dataset from a network-accessible device 224 (e.g., a Web server) along with an initial histogram, generated based on a default configuration, that represents the total range of values and their number of occurrences, or counts. Often, the dataset may be skewed and thus, the initial histogram may not provide a good visual representation, similar to that shown in histogram 108. Accordingly, in at least one embodiment, the data summarization module 104 may analyze the received dataset and/or initial histogram and determine that the dataset is skewed (e.g., contains extreme outlying values and/or high-hitters), and therefore, will not result in a good visual representation. For instance, the data summarization module 104 may determine that a threshold number of occurrences (e.g., at least eighty percent) in the dataset occur within a threshold value range (e.g., ten percent) of the total range of values or the data summarization module 104 may determine that a threshold number of occurrences (e.g., at least eighty percent) in the dataset occur within a threshold number of buckets (e.g., twenty percent of the buckets or two out of ten buckets).

At block 304, the data summarization module 104 creates or generates a set of segments that, when presented via a histogram or other data presentation tool, will result in a good visual distribution of at least a portion of the data. For example, to arrive at a final set of segments, the data summarization module 104 may perform any number of merge phases such as, for example, one or more of a first merge phase, a second merge phase and/or a third merge phase, as mentioned above and further discussed herein.

At block 306, the data presentation module 210 visually presents the segments to an observer via output unit(s) 220. In various embodiments, the individual segments are separately displayed (e.g., each as a separate histogram). The segments, when separately plotted as a histogram, may be visually presented to the user based on a scale (e.g., a regular scale or a log scale) selected by the scale selection module 212. Moreover, the outlier detection module 214 and the chart module 216 may configure additional dataset and segment information associated with the final set of segments for presentation. For example, the outlier detection module 214 is configured to detect outliers that may be relevant to understanding the dataset 102, and thus, the outlier detection module 214 identifies the outliers so that they can be presented to an observer, as a portion of the data summarization. The chart module 216 may be configured to generate one or more of a pie chart for values with the most occurrences (e.g., the most frequent values), a box plot, a chart of percentiles, or any other chart or graph that may help an observer understand the dataset. The data presentation module 210 may then selectively display information to the observer.

At block 308, the data presentation module 210 may receive input from an observer (e.g., a data analyst or other user viewing the data). For example, the input may be a selection of a segment not currently being plotted as a histogram (e.g., selecting Segment C in FIG. 1 while Segment B is currently being displayed). In another example, the input may be a selection requesting display of a particular chart or particular information that is not currently being displayed (e.g., table of outliers, pie chart of most frequent values, box plot, chart of percentiles, etc.).

At block 310, the data presentation module 210 adjusts the presentation of the dataset based on the input received (e.g., displays the histogram for Segment C and ceases to display the histogram for Segment B).

Figure 4:
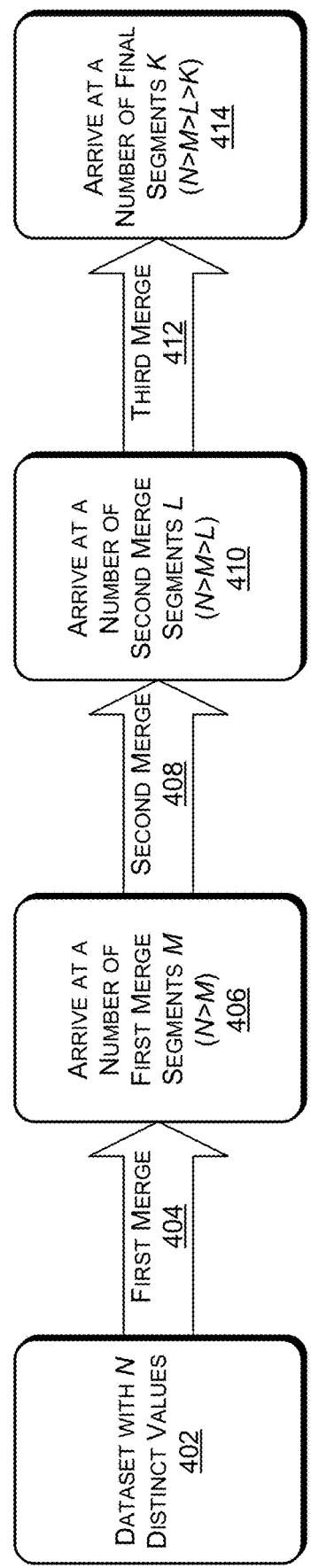
FIG. 4 illustrates an example sequence that merges values and segments of a dataset into a final set of segments to be separately presented as a visualization tool such as a histogram, in accordance with various embodiments.

FIG. 4 illustrates an example sequence 400 that may be implemented by the data summarization module 104 to arrive at the final set of segments for a dataset 102. The dataset 102 received by the data summarization module 104 may be a dataset with N distinct values 402 (e.g., integer, decimal, float, double, a time period, etc.). Each distinct value in the dataset may contain one or more occurrences (e.g., how frequent the value occurs in the dataset). The data summarization module 104 performs the first merge 404 to arrive at a number of first merge segments M 406 that is less than or equal to a first merge threshold (e.g., the first merge threshold being between fifty thousand and one hundred thousand segments). Each first merge segment in M is associated with one or more of the distinct values in N. The data summarization module 104 performs the second merge 408 to arrive at a number of second merge segments L 410 that that is less than or equal to a second merge threshold (e.g., the second merge threshold being one hundred and fifty segments). Each second merge segment in L is associated with one or more of the first merge segments in M. Finally, the data summarization module 104 performs the third merge 412 to arrive at a number of final segments K 414 that is less than or equal to a presentation threshold (e.g., the presentation threshold being ten segments). Each final segment in K is associated with one or more of the second merge segments in L.

As mentioned above, the data summarization module 104 performs the merge phases in FIG. 4 to create the final set of segments, wherein each segment in the final set provides a good visual experience of the data represented by the segment. Thus, the final set of segments may be visually preferred segments compared to a skewed or an unevenly distributed segment, such as histogram 108. The data summarization module 104 may perform the first merge when the dataset 102 is large. Thus, the first merge phase is directed to saving processing time and resources by initially reducing the large dataset to a manageable number of segments from which visual quality can be analyzed. As further discussed herein, the data summarization module 104 may perform the second merge phase based on the visual quality of the segments resulting from the first merge phase. Finally, the data summarization module 104 may perform the third merge phase based on a distribution of buckets within an individual second merge segment and/or the integrated visual quality of consecutive second merge segments.

Figure 5:
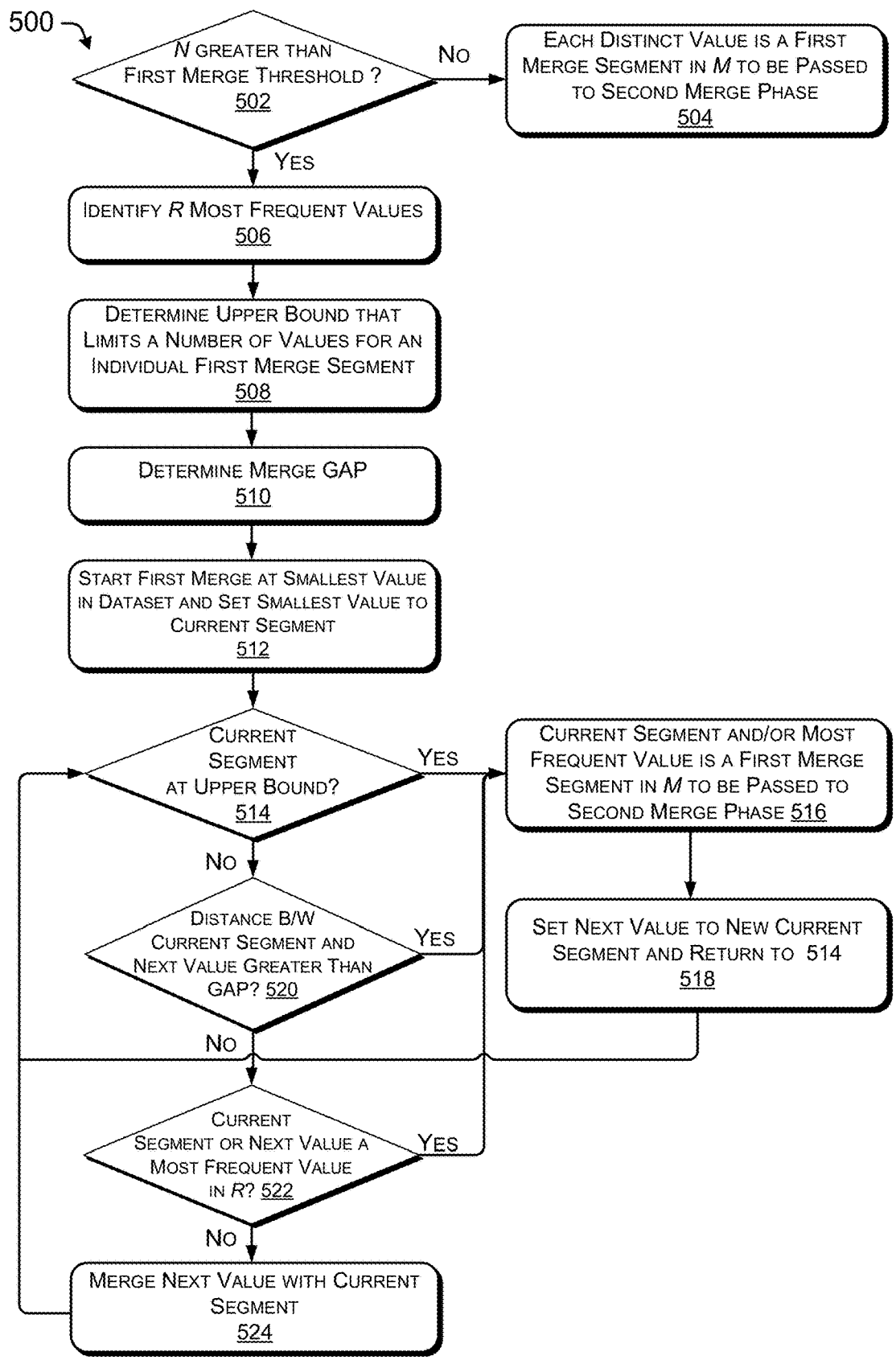
FIG. 5 illustrates an example process that merges values and/or segments until a first merge threshold is satisfied, in accordance with various embodiments.

FIG. 5 illustrates an example process 500 implemented by the data summarization module 104 to perform the first merge phase. The example process 500 may be implemented as part of operation 304 in FIG. 3. The first merge may be referred to as a general merge or rough merge of large datasets (e.g., over one hundred thousand distinct values). The first merge operation merges a number of distinct values that are close to each other in the dataset into one segment. The first merge is directed to reducing the number of distinct values N in the dataset that may be used to build a histogram to a number of first merge segments that can be efficiently handled by the second merge phase.

At block 502, the data summarization module 104 determines of the number of distinct values N in the dataset is greater than a first merge threshold. In various embodiments, the first merge threshold, i.e., the number of resulting first merge segments, may be a value between fifty thousand and one hundred thousand.

Figure 6:
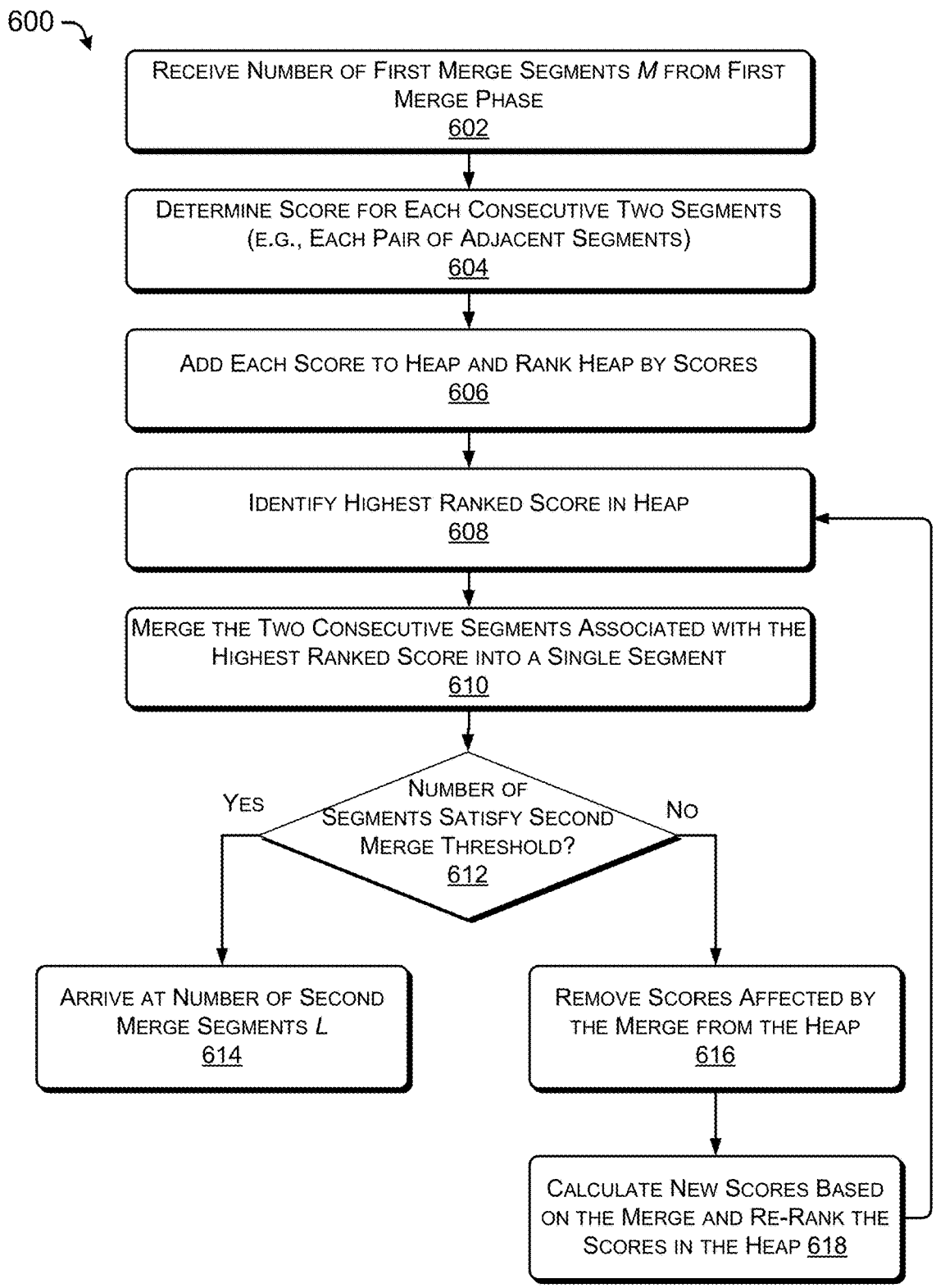
FIG. 6 illustrates an example process that merges values and/or segments until a second merge threshold is satisfied, in accordance with various embodiments.

If the answer is "No" at block 502, then at block 504 the data summarization module 104 sets each distinct value in N to a first merge segment and passes the number of first merge segments M (e.g., in this scenario N=M) to the second merge phase, as further discussed with respect to FIG. 6.

If the answer is "Yes" at block 502, then at block 506, the data summarization module 104 identifies values with the most frequency (e.g., the most number of occurrences in the dataset). That is, the data summarization module 104 may identify a threshold number of most frequent values R (e.g., the ten or twenty most frequent values). The most frequent values are values that, by rule, will not be merged with other values during the first merge phase. Rather, each of the most frequent values automatically represents a first merge segment in M that is independently passed to the second merge phase.

At block 508, the data summarization module 104 determines an upper bound that limits a number of individual distinct values that are close to each other in the data set that can be combined into an individual first merge segment. For instance, the data summarization module 104 may calculate the upper bound as follows:

$$\text{upper\_bound} = \left\lceil \frac{N}{\text{first\_merge\_threshold}} \right\rceil. \qquad \text{Equ. (1)}$$

Thus, if the number N of distinct values in the dataset is one million and the first merge threshold is fifty thousand, then the upper bound is equal to twenty.

At block 510, the data summarization module 104 determines a first merge gap ("GAP") which prevents the data summarization module 104 from merging into an individual first merge segment, consecutive values that are separated by at least a threshold distance. For example, the data summarization module 104 may set GAP to be twice the 50,000$^{th}$ biggest gap between two consecutive distinct values in N. Thus, in various embodiments, GAP may depend on the separation between some two consecutive values in the dataset. In an alternative embodiment, GAP may be a preset threshold distance, which may be based on other characteristics of the dataset.

After identifying the most frequent values (e.g., most frequent ten values) and flagging them as not to be merged, and after determining the upper bound and the merge GAP, the data summarization module 104 starts the first merge at block 512 by attempting to merge the current segment (e.g., that may already contain one or more values) with the next value (e.g., the next consecutive bigger distinct value). That is, the data summarization module 104 initially identifies the smallest value (e.g., the smallest value could be a negative number) or earliest value (e.g. if dealing with time periods such as days, months, etc.) in the dataset and sets the smallest value to the current segment under consideration.

At block 514, the data summarization module 104 determines if the current segment already has met the upper bound (e.g., has already reached a limit number of values). If "Yes" at block 514, the data summarization module 104, at block 516, sets the current segment as a first merge segment in M to be passed to the second merge phase, and at block 518, sets the next value in N to a new current segment to be considered in the decision operation at block 514.

If "No" at block 514, the data summarization module 104, at block 520, determines if the distance between the current segment and the next value is greater than GAP. If "Yes" at block 520, the data summarization module 104, at block 516, sets the current segment as a first merge segment in M to be passed to the second merge phase, and at block 518, sets the next value in N to a new current segment to be considered in the decision operation at block 514.

If "No" at block 520, the data summarization module 104, at block 522, determines if the current segment and/or the next value is a most frequent value in R that, by rule, is automatically associated with an individual first merge segment in M, (as determined at block 506). If "Yes" at block 522, the data summarization module 104, at block 516, sets one or both of the current segment and the next value (if a most frequent value in R) as a first merge segment in M to be passed to the second merge phase, and at block 518, sets the next value in N to a new current segment to be considered in the decision operation at block 514.

If "No" at block 522, the data summarization module 104, at block 524, merges the next value into the current segment and returns to the decision operation at block 514.

In various embodiments, the data summarization module 104 performs O(N) operations during the first merge phase to determine the GAP and O(N) operations to perform the first merges, resulting in a time complexity of O(N).

As discussed above, the first merge phase performed by the data summarization module 104 is a coarse or rough merge, that may not consider the visual quality of the first merge segments, M, produced (e.g., a number that is less than the first merge threshold). Rather, the first merge phase is directed to quickly reducing a large dataset to a manageable number of segments from which the data summarization module 104 can analyze visual quality. The second merge phase described herein with respect to FIG. 6 considers the visual quality of the first merge segments M generated from the first merge phase.

The visual quality of a histogram representing a dataset may be influenced by a variety of factors. First, the visual quality may be influenced by "completely invisible buckets" (CIB). Completely invisible buckets are those that contain such a small amount of data that the data cannot be seen in the histogram (e.g., bucket 114 in the histogram 108 of FIG. 1). The data summarization module 104 may determine that the bucket is an invisible bucket based on the number of occurrences compared to the scale of the y-axis (e.g., a CIB threshold). For example, bucket 114 may contain three occurrences (or other small number of occurrences) that are not visible on a histogram with a y-axis that ranges from zero to one hundred and twenty thousand, as seen in histogram 108. Completely invisible buckets may be misleading and may cause observers of the histogram to believe that there is no data for the bucket. This may deceive an observer attempting to understand the data distribution. Accordingly, the visual quality may be negatively correlated to a number of completely invisible buckets (num$_{CIB}$) in a histogram.

Second, the visual quality may be influenced by "almost invisible buckets" (AIB). Almost invisible buckets are those that can be seen in the histogram, but that, based on the scale of the y-axis, do not provide a positive effect on the visual representation of the histogram (e.g., buckets represented by 116 in the histogram 108). In various embodiments, the data summarization module 104 may determine that the bucket is an almost invisible bucket based on the number of occurrences compared to the scale of the y-axis (e.g., an AIB threshold). It is difficult to compare almost invisible buckets with one another due to the small frequency or number of data occurrences. Similar to completely invisible buckets, the visual quality of a histogram segment may be negatively correlated to the number of almost invisible buckets (num$_{AIB}$).

Third, the visual quality may be influenced by "empty buckets" (EB). Empty buckets are those that contain no data, yet the value represented by the empty bucket is shown in the histogram (e.g., bucket 118 in histogram 108). Empty buckets may provide relevant information to observers. However, if a histogram contains too many empty buckets over a large span of values, then it would be better to split the histogram into segments to help viewers discover some local information surrounding non-empty buckets. Thus, the number of empty buckets (num$_{EB}$) and the range of values represented in the histogram (range$_{hist}$) may affect the visual quality of the histogram. Moreover, observers may also have difficulties distinguishing between completely invisible buckets and empty buckets, Finally, the visual quality of a histogram may also depend on a total number of buckets (num$_B$). For instance, if a histogram contains too many buckets, e.g. over fifty, it may lose its effectiveness to summarize the data distribution and it may present a huge visual burden to an observer to quickly view and understand the dataset.

Based on the various factors described above, the data summarization module 104 may define the visual quality QV of a histogram as follows:

$$QV = QCI \cdot QAI \cdot QE \cdot QN \quad \text{Equ. (2)}$$

where, $$QCI = e^{-\alpha_{CI} \cdot num_{CIB}} \quad \text{Equ. (3)}$$

$$QAI = e^{-\alpha_{AI} \cdot num_{AIB}} \quad \text{Equ. (4)}$$

$$QE = 1 - \frac{num_{EB}}{num_B} \cdot \frac{range_{hist}}{range_{total}} \quad \text{Equ. (5)}$$

$$QN = \begin{cases} 1, & num_B \leq \alpha_{maxB} \\ 2 - \dfrac{2}{1 + e^{\alpha_{maxB} - num_B}}, & \text{otherwise} \end{cases} \quad \text{Equ. (6)}$$

In equation (5), $range_{total}$ represents the range of values for the whole dataset. As further discussed herein, the $range_{hist}$ may represent the range of values for an individual first merge segment generated from the first merge phase. Moreover, $\alpha_{CI}$, $\alpha_{AI}$ and $\alpha_{maxB}$ are parameters preset by the data summarization module 104. For example, the data summarization module 104 may set $\alpha_{CI}=3$, $\alpha_{AI}=1.5$, and $\alpha_{maxB}=25$.

In light of the discussion of the visual quality above, the data summarization module 104 implements the second merge phase to produce a number of second merge segments L (e.g., less than one hundred and fifty segments) based on visual quality. FIG. 6 illustrates an example process 600 implemented by the data summarization module 104 to perform the second merge phase. The example process 600 may be implemented as part of operation 304 in FIG. 3. The second merge phase is directed to merging two consecutive segments.

At block 602, the data summarization module 104 identifies or receives the number of first merge segments M provided via the example process 500 in FIG. 5. In various embodiments, the number M may be no more than the first merge threshold (e.g., fifty thousand segments or one hundred thousand segments).

At block 604, the data summarization module 104 determines a score for each consecutive two first merge segments (e.g., a pair of adjacent segments). Each first merge segment may include a number of values (e.g., buckets) limited by the upper bound, and a first merge segment may also include empty values or empty buckets. For instance, given two consecutive first merge segments $S_i$ and $S_{i+1}$, the calculated score may represent an improvement of quality if the two segments are merged $S_i \cup S_{i+1}$. Thus, the score may be calculated as follows:

$$Score_{S_i,S_{i+1}} = QV_{S_i \cup S_{i+1}} - \frac{QV_{S_i} + QV_{S_{i+1}}}{2} \cdot \sqrt{\log_{f_{S_i \cup S_{i+1}}} f_{total}} \quad \text{Equ. (7)}$$

Here, $f_{S_i \cup S_{i+1}}$ is a frequency of data within segment $S_i$ and segment $S_{i+1}$, and $f_{total}$ is a total frequency of the whole dataset.

Once calculated, the data summarization module 104 adds each score to a heap at block 606 and maintains the heap of scores as a ranked heap (e.g., ranked based on the scores). At block 608, the data summarization module 104 identifies the highest ranked score in the heap (e.g., the score at the top of the heap), and at block 610 the data summarization module 104 merges the two consecutive segments ($S_i$ and $S_{i+1}$) associated with the highest score into a merged segment $S_i \cup S_{i+1}$.

At block 612, the data summarization module 104 determines if a number of segments remaining after the merge satisfies (e.g., is less than or equal to) a second merge threshold (e.g., one hundred and fifty). If the answer at block 612 is "Yes", then at block 614, the data summarization module 104 sets the remaining number of segments (e.g., equal to or less than the second merge threshold) as the number of second merge segments L to be passed to the third merge phase, as further discussed herein with respect to FIG. 7.

If the answer at block 612 is "No", then at block 616, the data summarization module 104 removes scores affected by the previous merge from the heap (e.g., any scores based on a segment that overlaps the merged segments). For example, the data summarization module 104 may remove $Score_{S_i,S_{i+1}}$, $Score_{S_{i-1},S_i}$ and $Score_{S_{i+1},S_{i+2}}$ from the heap.

At block 618, the data summarization module 104 calculates new scores after, and based on, the merge that occurs at block 610, adds the new scores to the heap and re-ranks the heap based on the new scores. For example, the data summarization module 104 may calculate $Score_{S_{i-1},S_i \cup S_{i+1}}$ and $Score_{S_i \cup S_{i+1},S_{i+2}}$ and add the newly calculated scores to the heap. The process then returns to operation 608 where data summarization module 104 identifies the highest ranked score in the heap.

Accordingly, the example process 600 will further reduce the number of segments provided via the first merge phase to a number of second merge segments L that is less than or equal to the second merge threshold (e.g., one hundred and fifty).

In various embodiments, the data summarization module 104 may perform O(M) heap operations, where M stands for the number of first merge segments generated by the first merge phase. Each heap operation may cost O(log M) basic operations. The data summarization module 104 may also perform O(M) evaluations of the segments' visualization quality, and each of these evaluations costs O(log N) basic operations. A total time complexity of the second merging phase may be determined as O(M log M+M log N).

While the second merge phase considers the visual quality of segments when merging two segments, the second merge phase does not consider whether or not an individual bucket in a segment is representative of the data within the range of values the bucket represents. That is, neither the first merge phase nor the second merge phase is directed to evaluating whether or not the data within a bucket is distributed evenly.

Figure 7:
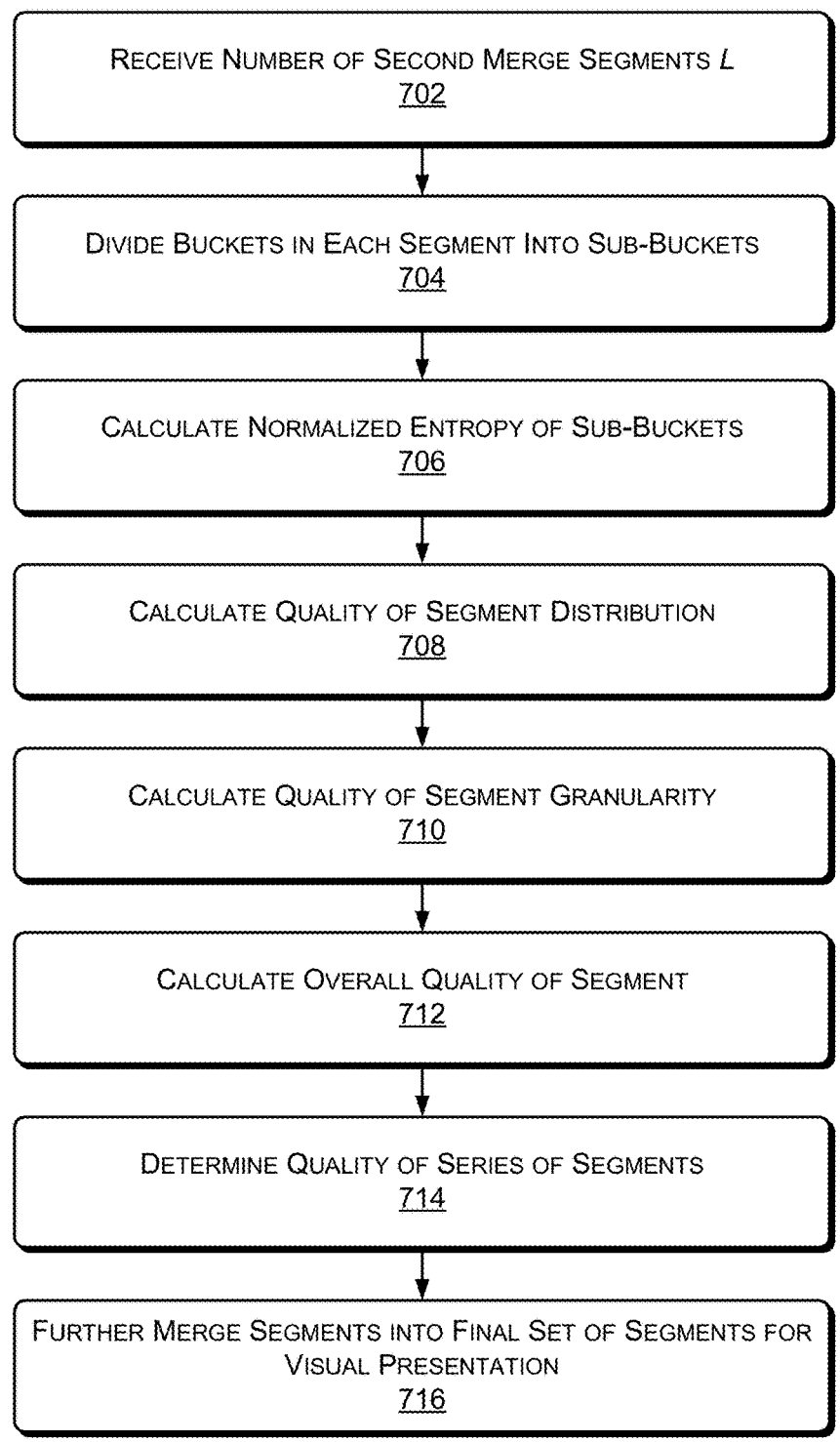
FIG. 7 illustrates an example process that merges values and/or segments until a presentation threshold is satisfied, in accordance with various embodiments.

The final, or third, merge phase is directed to considering whether or not data represented by an individual bucket in a segment is distributed evenly. An effective bucket in a histogram is one where the data is distributed evenly. In various embodiments, the data summarization module 104 uses "normalized entropy" to evaluate whether data in a bucket is distributed evenly, as further discussed herein. The third merge phase also considers an integrated quality of a series of segments. FIG. 7 shows an example process 700 implemented by the data summarization module 104 to perform the third and final merge phase. The example process 700 may be implemented as part of operation 304 in FIG. 3.

At block 702, the data summarization module 104 identifies or receives the number of second merge segments L provided via the example process 600 in FIG. 6. In various embodiments, the number L may be at or less than the second merge threshold (e.g., one hundred and fifty).

At block 704, the data summarization module 104 further divides the data in individual buckets for each second merge segment into sub-buckets. For instance, the data summarization module 104 may determine the minimal gap (MinGap$_{bucket}$) between each pair of consecutive distinct values in the bucket and use the minimal gap as a sub-range to divide the data in the bucket. Accordingly, in various embodiments, the data summarization module 104 divides a bucket to provide W sub-buckets (e.g., subB$_1$, subB$_2$, ..., subB$_W$), as follows:

$$W = \left\lceil \frac{range_{bucket}}{MinGap_{bucket}} \right\rceil \qquad \text{Equ. (8)}$$

Here, range$_{bucket}$ is the value range of the bucket.

To reduce calculation complexity, the data summarization module 104 may alternatively divide a bucket to provide the W sub-buckets (e.g., subB$_1$, subB$_2$, ..., subB$_W$), as follows:

$$W = \text{minimal}\left\{\left\lceil \frac{range_{bucket}}{MinGap_{bucket}} \right\rceil, \alpha_{subB}\right\} \qquad \text{Equ. (9)}$$

Here, $\alpha_{subB}$ is a parameter preset by the data summarization module 104 (e.g., $\alpha_{subB}$=10).

At block 706, the data summarization module 104 calculates the normalized entropy of the sub-buckets. For example, the data summarization module 104 may calculate the normalized entropy to determine the distribution quality of the bucket QD$_{bucket}$, as follows:

$$QD_{bucket} = \begin{cases} 1, & W = 1 \\ \frac{-\sum_{i}^{W} \frac{f_{subB_i}}{f_{bucket}} \cdot \log\frac{f_{subB_i}}{f_{bucket}}}{\log W}, & W > 1 \end{cases} \qquad \text{Equ. (10)}$$

In equation 10 above, $f_{subB_i}$ stands for a frequency of data in subB$_i$ and $f_{bucket}$ stands for a frequency of data in the bucket as a whole.

At block 708, the data summarization module 104 calculates the quality of segment distribution. For instance, if a histogram (e.g., a second merge segment) is composed of NumB buckets (e.g., bucket$_1$, bucket$_2$, ..., bucket$_{NumB}$), the data summarization module 104 may calculate the quality of the segment distribution as an arithmetic average of the distribution quality of the individual buckets in the segment, as follows:

$$QD = \frac{\sum_{i=1}^{NumB} QD_{bucket_i}}{NumB} \qquad \text{Equ. (11)}$$

At block 710, the data summarization module 104 calculates the quality of segment granularity. Segment granularity reflects a degree of difference between the data in a segment compared to the total range of the dataset. Thus, the data summarization module 104 may calculate the quality of segment granularity, as follows:

$$QG = e^{-\frac{MinGap_{hist}}{range_{total}}} \qquad \text{Equ. (12)}$$

Here, MinGap$_{hist}$ is the minimal gap between every pair of consecutive distinct values in the histogram (e.g., segment).

Accordingly, at block 712, the data summarization module 104 calculates the overall quality of an individual segment as follows:

$$Q = QV^2 \cdot QD \cdot QG \qquad \text{Equ. (13)}$$

Evaluating the quality of a series of segments is based on various criteria. First, if two consecutive segments can be well presented by only one segment, then the two consecutive segments will not remain separate (e.g., the segments will be merged). Second, the data summarization module 104 prefers presenting the dataset with a smaller number of segments (e.g., an observer does not want to have to view and select between a large number of segments if they can view a clear picture of the dataset in a small number of segments). Thus, the data summarization module 104 considers whether or not to merge two consecutive segments $S_i$ and $S_{i+1}$ based on the quality of the segments. For example, $S_i$ and $S_{i+1}$ may not be an ideal partition if:

$$Q_{S_i \cup S_{i+1}} > \text{minimal}(Q_{S_i}, Q_{S_{i+1}}) \cdot \alpha_{badPart} \qquad \text{Equ. (14)}$$

Here, $\alpha_{badPart}$ is a parameter preset by the data summarization module 104 (e.g., $\alpha_{badPart}$=0.9).

Therefore, at block 714, the data summarization module 104 determines the quality of a series of segments ($S_1$, $S_2$, ..., $S_L$), where L stands for the number of second merge segments provided by the second merge phase in FIG. 6. For instance, the quality of a series of segments may be calculated as follows:

$$Q_{S_1, S_2, ..., S_L} = \sqrt[L]{\prod_{i=1}^{L} Q_{S_i}} \cdot e^{-\alpha_{mutual} \frac{num_{badPart}}{L}} \cdot \alpha_{comp}^{L-1} \qquad \text{Equ. (15)}$$

In equation 15 above, num$_{badPart}$ stands for the number of bad partitions, $\alpha_{mutual}$ and $\alpha_{comp}$ are parameters preset by the data summarization module 104 (e.g., $\alpha_{mutual}$=0.6 and $\alpha_{comp}$=0.98).

At block 716, the data summarization module 104 merges the series of segments provided via the second merge into a smaller, final set of segments SS$_1$, SS$_2$, ..., SS$_K$ (i.e., the segments are bigger and cover a larger range of values as a result of the third merge) such that the quality of SS$_1$, SS$_2$, ..., SS$_K$ reaches a maximum and/or a number of segments in the final set is less than or equal to an overall dataset segment presentation threshold (e.g., K is less than or equal to ten segments). The data summarization module 104 may achieve the final set of segments using dynamic programming. That is, the data summarization module 104 may define f[i,j,L] as the maximal merging quality that merges the first i second merge segments into L bigger segments. The last segment may be defined as $\cup_{l=j}^{i} S_l$. Moreover, the data summarization module 104 may define $Q_{i,j}$ as $Q_{\cup_{L=j}^{i} S_L}$ and g[i,j,L]=L·ln(f[i,j,L]·$\alpha_{comp}^{1-L}$). Then the data summarization module 104 may employ the state transition equation of the dynamic programming, as follows:

$$g[i, 1, 1] = \ln Q_{1,i} \quad \text{Equ. (16)}$$

$$g[i, j, L] = \ln Q_{j,i} +$$

$$\max_{1 \leq l < j} \{g[j-1, l, L-1] - \begin{cases} \alpha_{mutual}, & bad_{part} < S_{i,j-1}, S_{j,i} > \\ 0, & \text{otherwise} \end{cases}\}$$

Based on the state transition equation 16, the data summarization module 104 finds $$\max_{L=1,2,\ldots,K} \left\{ e^{\frac{g[m,1,L]}{L}} \cdot \alpha_{comp}^{L-1} \right\}.$$

Here, the data summarization module 104 calculates $O(m^2)$ times segment quality, where m is the second merge threshold (e.g., m=150), and each quality evaluation costs $O(\log N)$ basic operations. The time complexity of dynamic programming is $O(m^3)$. The time complexity of this operation is $O(\log N)$, with a large constant factor.

After these three merge phases, the data summarization module 104 arrives at the final set of segments (e.g., a number K that is less than or equal to the segment presentation threshold) so that the dataset can be visually presented to an observer.

Once the set of segments are configured for presentation by the data summarization module 104, the scale selection module 212 may select a scale to plot the histogram for individual segments. For example, the scale selection module 212 may select between a regular scale or a log scale when plotting the histogram. To select the scale, the scale selection module 212 considers a histogram as a distribution on discrete values. If the histogram's kurtosis is high, the histogram is more likely to have a sharpened distribution. When kurtosis is larger than a preset kurtosis threshold (e.g., two), the scale selection module 212 may set the default scale of the histogram to be a Log 10 scale. For instance, suppose the histogram consists of several value-frequency pairs, $\{<v_i, f_i>\}$, i=1, ..., n, the data summarization module 104 may calculate the kurtosis as follows:

$$\text{kurtosis} = \frac{\frac{1}{n}\sum_{i=1}^{n} fi \cdot \left(\frac{i}{n} - \bar{v}\right)^4}{\left(\frac{1}{n}\sum_{i=1}^{n} fi \cdot \left(\frac{i}{n} - \bar{v}\right)^2\right)^2} - 3 \quad \text{Equ. (17)}$$

Where, $$\bar{v} = \frac{\sum_{i=1}^{n} fi \frac{i}{n}}{\sum_{i=1}^{n} fi}.$$

In various embodiments, the outlier detection module 214 may detect outliers in the dataset 102. Outliers are values in the dataset that deviate significantly (e.g., more than one, two or three standard deviations) away from most of the values. However, the outliers may be relevant to understanding the dataset, and thus, the outlier detection module 214 identifies the outliers so they can be presented to the users, as a portion of the overall data summarization. As a result of the segmenting and merging discussed above, global outliers may be labeled as independent segments. However, an individual segment may have local outliers. Therefore, the outlier detection module 214 may implement a local outlier detection algorithm to assign each value in a segment a score that reflects its likelihood of being an outlier. The outlier detection module 214 may adapt a method that assigns a score to a value v based on local outlier probabilities of v, where the neighborhood of v is the set of T nearest neighbors of v and $$T = \frac{\text{Total frequency}}{10,000}.$$

In some embodiments, the outlier detection module 214 detects values that have scores greater than or equal to three. If there are more than a particular number of those values (e.g., nine), the outlier detection module 214 selects the particular number of values with highest scores to be the outliers.

In various embodiments, the chart module 216 uses the data in the dataset and the results of the segmenting and merging, to configure various charts, graphs and/or tables to supplement the histograms built for the segments. For example, the chart module 216 may configure a pie chart showing the most frequent values, a table showing a list of local outliers, a chart of percentiles, a box plot, etc.

In various embodiments, the chart module 216 maintains a list of a threshold number of the most frequent values in each segment (e.g., the ten most frequent values). Then, the data presentation module 210 may display the most frequent values for each segment, or a portion thereof. For example, chart module 216 and/or data presentation module 210 may display the most frequent values whose frequency is more than ten percent of the total frequency of a segment, or whose frequency is more than ten times that of the next frequent value. In some instances, a pie chart may be used to show the most frequent values.

Figure 8:
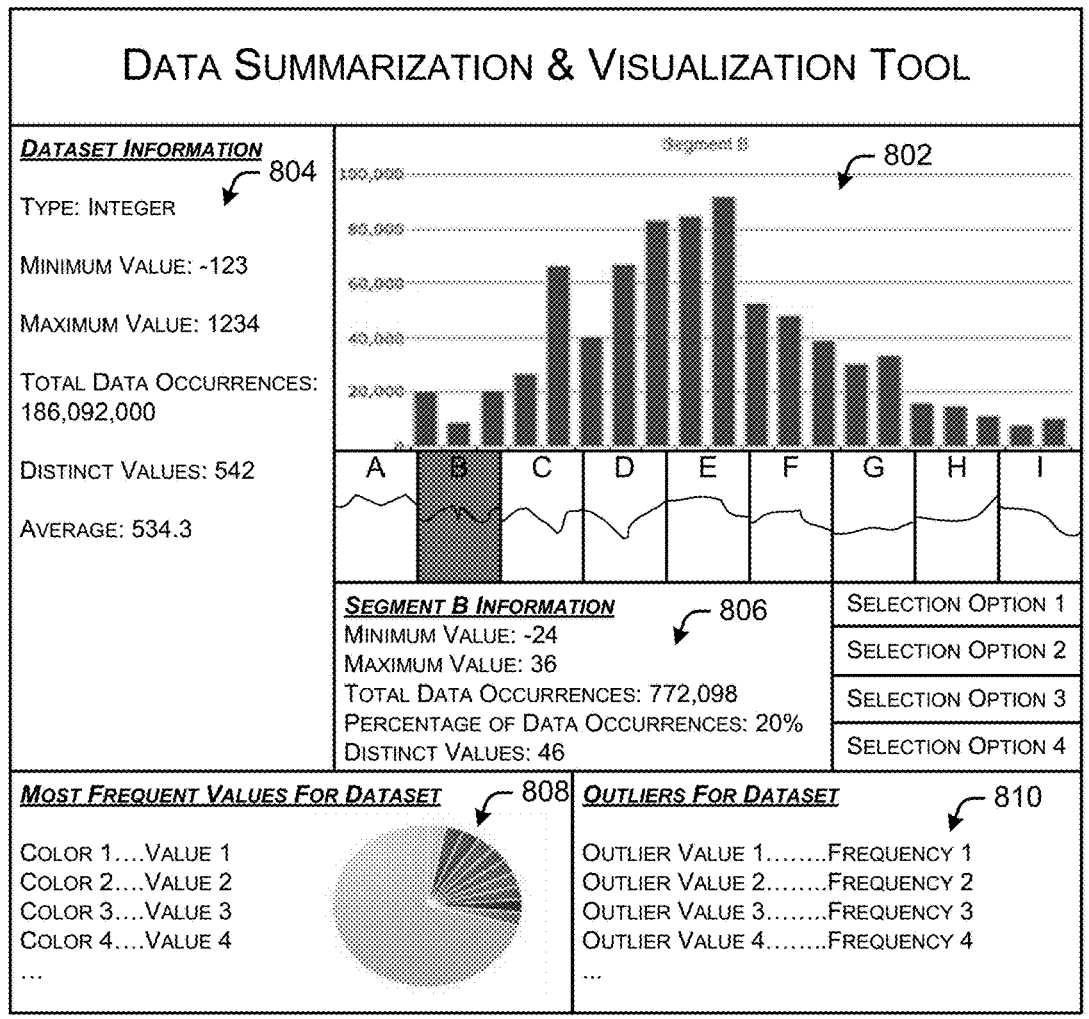
FIG. 8 illustrates an example data summarization and visualization tool that may be presented to an observer, in accordance with various embodiments.

FIG. 8 illustrates an example data summarization and visualization tool 800 that the data presentation module 210 may present to an observer (e.g., a data analyst or other person attempting to understand the dataset). That is, the data presentation module 210 may configure an overall summarization of the dataset for the observer, as well as information associated with an individual segment. Therefore, in at least one embodiment, the data presentation module 210 may initially display the final set of segments as selectable segments (e.g., Segments A-I are selectable and when Segment B is selected, for example, the histogram built for Segment B is displayed at 802). In various embodiments, the data presented may be altered based on user input and/or user adjustments to default settings.

Moreover, the data presentation module 210 may also present other information about the dataset 102. For example, the example data summarization and visualization tool 800 may include information related to the whole dataset 804, such as type of data (e.g., integer), minimum and maximum values, total number of data occurrences across the range of values in the dataset, the number of distinct values N in the dataset, the average value, and so forth. The example data summarization and visualization tool 800 may also include segment specific information 806 relating to the segment currently being displayed (e.g., Segment B in FIG. 8). This information 806 may include the minimum and maximum value of the segment (e.g., the range), a total number of data occurrences in the segment, percentage of data occurrences in the segment to the total number of data occurrences in the dataset, distinct values in the segment, and so forth.

In various embodiments, the data presentation module 210 may display the most frequent values for the whole dataset along with a pie chart 808, or a table of outliers and the frequency of each outlying value 810. Moreover, the data presentation module 210 may present particular information in response to user selectable options. For example, the user may select to view a box plot and/or percentile graph instead of the most frequent values and the outliers. Thus, similar to the selectable segments, the user may be able to select particular supplemental information to be displayed.

CONCLUSION

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A method comprising:
receiving a dataset containing a number of distinct values, each distinct value having one or more occurrences in the dataset;
generating, by one or more processors and based on the distinct values in the dataset, a first plurality of segments that is less than or equal to a first segment threshold, wherein each of the first plurality of segments is associated with a plurality of distinct values;
determining a visual quality of each of the first plurality of segments, wherein the visual quality of an individual segment is based in part on a number of buckets in the individual segment that include a number of occurrences that are less than a minimum threshold number of occurrences related to presenting an effective data distribution, wherein the minimum threshold number of occurrences related to presenting the effective data distribution is established to capture at least one of a number of completely invisible buckets in the segment, a number of almost invisible buckets in the segment, or a number of empty buckets in the segment;
merging, based in part on the visual quality of each of the first plurality of segments, at least a portion of the first plurality of segments until the first plurality of segments is reduced to a second plurality of segments that is less than or equal to a second segment threshold;
determining a quality of data distribution for each of the second plurality of segments;
merging, based in part on the quality of data distribution determined for each of the second plurality of segments, at least a portion of the second plurality of segments into a final set of segments, wherein an individual segment in the final set of segments covers a range of values in the dataset;
generating a histogram for each segment in the final set of segments; and
presenting information associated with each segment in the final set of segments, wherein the information presented includes at least one histogram generated for at least one segment from the final set of segments.

2. The method of claim 1, wherein at least some of the segments in the final set of segments have a different x-axis scale or y-axis scale.

3. The method of claim 1, wherein the generating the first plurality of segments that is less than or equal to the first segment threshold comprises:
determining that the number of distinct values contained in the dataset is less than or equal to the first segment threshold; and
associating each distinct value with an individual segment in the first plurality of segments.

4. The method of claim 1, wherein the generating the first plurality of segments that is less than or equal to the first segment threshold comprises:
determining that the number of distinct values contained in the dataset is greater than the first segment threshold; and
merging at least a portion of the distinct values into one or more individual segments to generate the first plurality of segments that is less than or equal to the first segment threshold.

5. The method of claim 1, wherein a number of segments in the final set of segments is less than or equal to a segment presentation threshold.

6. The method of claim 5, wherein:
the first segment threshold is a number greater than fifty thousand;
the second segment threshold is a number between fifty and three hundred; and
the segment presentation threshold is a number between five and fifty.

7. One or more computer storage media storing computer executable instructions that, when executed, perform operations comprising:
receiving a dataset containing values that span a dataset range of values, wherein each value in the dataset range of values includes a frequency of occurrences in the dataset;
determining a visual quality of the dataset range of values based in part on a number of values in the dataset range of values that have a respective frequency of occurrences that is less than a minimum threshold number of occurrences established to present a data distribution in a histogram, wherein the minimum threshold number of occurrences established to present the data distribution in the histogram is established to capture at least one of a number of completely invisible buckets, a number of almost invisible buckets, or a number of empty buckets;
merging, based in part on the visual quality, at least a portion of the values to create a plurality of segments, a number of the plurality of segments being less than or equal to a segment presentation threshold;
generating a histogram for each segment in the plurality of segments; and
presenting information associated with each segment in the plurality of segments, wherein the information presented includes at least one histogram generated for at least one segment from the plurality of segments.

8. The one or more computer storage media of claim 7, wherein at least some of the segments in the plurality of segments have a different x-axis scale or y-axis scale.

9. The one or more computer storage media of claim 7, wherein the segment presentation threshold is a number between five and fifty.

10. A system comprising:
one or more processors;
one or more computer memories;
a data summarization module, stored on the one or more memories and operable on the one or more processors, to:
receive a dataset with distinct values that span a dataset range of values;
determine a visual quality of the dataset range of values based in part on a number of values in the dataset range of values that have a respective frequency of occurrences that is less than a minimum threshold number of occurrences established to present a data distribution in a data visualization, wherein the minimum threshold number of occurrences established to present the data distribution in the data visualization is established to capture at least one of a number of completely invisible buckets, a number of almost invisible buckets, or a number of empty buckets; and
merge the distinct values based in part on the visual quality to create a plurality of segments, wherein each segment is associated with a data visualization that represents a portion of the dataset range of values; and
a data presentation module, stored on the one or more memories and operable on the one or more processors, to display one or more of the respective data visualizations.

11. The system of claim 10, wherein at least some of the respective data visualizations have a different x-axis scale or y-axis scale.

12. The system of claim 10, wherein a number of the plurality of segments is less than or equal to a segment presentation threshold associated with a number between five and fifty.

13. The system of claim 10, wherein the data presentation module displays the one or more data visualizations in response to a selection of a segment.

14. The system of claim 10, wherein the merging is further based in part on a quality of data distribution for a segment.

* * * * *